United States Patent [19]

Wear

[11] 4,213,891

[45] Jul. 22, 1980

[54] THERMOFORMABLE, HIGH IMPACT LOW-SMOKE PLASTIC

[75] Inventor: George H. Wear, Mogadore, Ohio

[73] Assignee: The General Tire & Rubber Company, Akron, Ohio

[21] Appl. No.: 970,417

[22] Filed: Dec. 18, 1978

Related U.S. Application Data

[63] Continuation-in-part of Ser. No. 940,424, Sep. 7, 1978, abandoned, which is a continuation of Ser. No. 759,924, Jan. 17, 1977, abandoned.

[51] Int. Cl.² .................. C08L 23/28; C08L 27/24; C08L 33/08; C08L 51/00
[52] U.S. Cl. ........................... 260/45.75 S; 525/81; 525/82; 525/85; 260/45.75 T
[58] Field of Search ........ 260/876, 897, 899, 45.75 T, 260/45.75 S; 525/80, 81, 82, 85

[56] References Cited

U.S. PATENT DOCUMENTS

| | | | |
|---|---|---|---|
| 3,299,182 | 1/1967 | Jennings et al. | 260/897 |
| 3,334,156 | 8/1967 | Calentine et al. | 260/884 |
| 3,488,406 | 1/1970 | Sehm | 260/899 |

*Primary Examiner*—Carman J. Seccuro

[57] ABSTRACT

A plastic composition which emits a reduced amount of smoke when heated to flame temperature is thermoformable and high impact resistant is made by blending chlorinated polyvinyl chloride, a mixture of chlorinated polyethylenes, an alkyl acrylate polyvinyl chloride copolymer, and a mixture of a tin process aid and heat stabilizer. The plastic has application in thermoformed, high impact trim parts in aircraft and mass transit vehicles. The reduced amount of smoke emitted when the plastic reaches high temperature aids occupants of a plane or mass transit vehicle to visually find the high temperature source and/or to find their way to an exit when a fire, electrical short circuit or other high temperature condition occurs.

3 Claims, No Drawings

THERMOFORMABLE, HIGH IMPACT LOW-SMOKE PLASTIC

CROSS-REFERENCE TO RELATED APPLICATIONS

This application is a continuation-in-part of patent application Ser. No. 940,424 filed Sept. 7, 1978, now abandoned, which in turn is a continuation of patent application Ser. No. 759,924 filed Jan. 17, 1977 now abandoned.

BACKGROUND OF THE INVENTION

1. Field of the Invention

This invention relates to a blend of chlorinated polyvinyl chloride with a mixture of chlorinated polyethylenes, a graft polyvinyl chloride alkyl acrylate copolymer and a mixture of a tin mercaptide with a tin carboxylate.

2. Description of the Prior Art

Polyvinyl chloride and polyvinyl chloride blended with other materials such as chlorinated polyethylenes are known and have been used for a variety of products. For examples of such blends see U.S. Pat. No. 3,006,889 Frey (1961). The problem which was overcome by the Frey invention was the difficulty of softening of the hard polyvinyl chloride. This was accomplished by blending the hard polyvinyl chloride with a softer chlorinated polyethylene. One of the problems of the softer material was that its heat distortion temperature was too low. The heat distortion problem was in part solved by the invention set forth in U.S. Pat. No. 3,299,182 Jennings et al (1967). Jennings employed a mixture of a chlorinated polyvinyl chloride having a high heat softening temperature with a small amount of a homogeneously chlorinated polyethylene.

While the prior art compositions had acceptable nonflammable characteristics and heat softening characteristics, they lacked a good balance of properties for a rigid CPVC processability, thermoformability, low smoke emission, high impact strengths and thermoformability are the properties which must be balanced. The prior art fails to teach rigid CPVC compositions which would meet low smoke requirements and which are processable into sheets and which sheets are thermoformable and which have high impact strengths. Aircraft and mass transit trim parts must be strong, resist impact, be aesthetically pleasing and generate low amounts of smoke when heated to high temperatures. The problems of smoke generation include:

(1) service personnel not being able to find the source of the problem visually, and (2) occupants of the smoke-filled plane or vehicle being unable to visually find an exit.

SUMMARY OF THE INVENTION

The present invention is directed to a blend of chlorinated polyvinyl chloride with chlorinated polyethylene, an alkyl acrylate polyvinyl chloride graft copolymer, and a mixture of organo sulfur tin compound with a tin carboxylate. The blend of the present invention can be readily extruded into sheets and then thermoformed into aesthetically pleasing trim parts for aircraft and mass transit vehicles. In addition, when subjected to flame or high temperature conditions, the trim parts of the present invention emit a relatively low quantity of smoke, thus, allowing for a visual location of the problem and/or the occupants of a burning vehicle or aircraft visually finding their way to safety.

DESCRIPTION OF THE PREFERRED EMBODIMENTS

The present invention is directed to a composition containing 100 parts of chlorinated polyvinyl chloride having a chlorine content of from 60% to 70%; from 5 to 30 parts of a mixture of chlorinated polyethylenes, from 50 to 95% of the mixture having a molecular weight of over 100,000 and a chlorine content of from 25% to 45% and from 5% to 50% of the mixture being a low molecular weight of from 20,000 to 100,000 and a chlorine content of from 25% to 45%; 5 to 25 parts of a cross-linked poly(alkyl acrylate) polyvinyl chloride graft copolymer, and from 1 to 10 parts of mixture of a tin process aid and heat stabilizer.

The chlorinated polyvinyl chloride is present at a level of 100 parts by weight. The chlorinated polyvinyl chloride used in the practice of the present invention has a molecular weight of from 50,000 to 140,000 and preferably 80,000 to 120,000. Methods of making the chlorinated polyvinyl chloride are set forth in U.S. Pat. Nos. 3,334,078, Gateff (1967); 3,100,762 Shockney (1963); 3,621,080 Deconene; 2,996,489, Dannis (1961); 2,230,000 Hauffe (1941); 2,586,363 McAlevry (1952); 3,334,077 Gateff (1964); 3,167,535 Gateff (1962); and British Pat. No. 481,515 (1938).

The material is generally hard and brittle and it is necessary, to soften it and to improve its impact resistance. One of the materials which is added to improve the processability and the impact resistance of the chlorinated polyvinyl chloride is a mixture of high and low molecular weight chlorinated polyethylenes. The chlorinated polyethylenes are present at a level of from 5 to 30 parts and preferably from 5 to 15 parts.

The high molecular weight chlorinated polyethylene is preferably present at a level of from 65% to 85% of the mixture. The chlorine content of the preferred low and high molecular weight polyethylenes can vary from 30% to 42% and the molecular weight of the preferred low molecular weight chlorinated polyethylene is from 20,000 to 40,000.

The chlorinated polyethylenes used in the practice of the present invention are known in the art and details relating to their preparation will not be fully set forth here. The preparation of the chlorinated polyethylene is adequately set forth in the prior art, see for example U.S. Pat. Nos. 2,405,971 McAlevry, 2,592,763 Taylor (1952) and 3,940,456 Frey (1976).

The use of the low molecular weight chlorinated polyethylenes to plasticize polyvinyl chloride is disclosed in U.S. Pat. No. 3,467,732 Schuebelen (1969).

"As indicated, polyolefins having a molecular weight of from about 20,000 to less than about 1,000,000 may be used. It has been found, however, that the molecular weight of the polyolefin has some influence on the effectiveness of the chlorinated product obtained as an impact modifier for vinyl chloride polymers. More particularly, it has been found that the polyolefins described herein having molecular weights between about 20,000 to 40,000 are most effective when chlorinated to an extent of from about 20 to 28 percent by weight of chemically combined chlorine; polyolefins having a molecular weight of from about 40,000 to 100,000 are most effective when chlorinated to an extent of from about 25 and 35 percent by weight of chemically combined chlorine; and polyolefins having molecular weights of about 100,000 or more are most effective when chlorinated to an extent of from about 30 to 38 percent by weight of chemically combined chlorine".

The chlorinated polyethylene mixture is a process aid in addition to improving the impact resistance of the hard, brittle chlorinated polyvinyl chloride. Materials within the ranges set forth above can be homogeneous materials or heterogeneous mixtures of materials.

To further improve the processability of the blend of the chlorinated polyvinyl chloride with the chlorinated polyethylene, a graft copolymer of vinyl chloride onto rubbery cross-linked alkyl acrylate backbone is also added. The graft copolymer is preferably present at a level of 10 to 20 parts by weight. The graft copolymer is also well known in the art having been described in U.S. Pat. No. 3,334,156 Calentine, et al (1967).

The preferred monoethylenically unsaturated monomer materials for use in forming the backbone copolymers are acrylic-type esters of the formula:

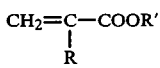

wherein
R is a monovalent radical selected from the group consisting of hydrogen and 1 to 4 carbon atom alkyl, and
R' is a monovalent radical selected from the group consisting of 2 to 15 carbon atom alkyl where R is hydrogen and 5 to 18 carbon atom alkyl when R is alkyl.

The initial flexible polymer formation can be accomplished using individual esters of the specified type or mixtures thereof, e.g., mixtures of various alcohol esters of acrylic and methacrylic acid obtained as commercial products or desired combinations of the esters.

In addition, various combination of these acrylic-type esters with other monoethylenically unsaturated copolymerizable materials may be employed, e.g., mixtures of the alkyl esters of the specified formula with styrene, methyl methacrylate, vinyl acetate, acrylonitrile and comparable copolymerizable materials. Advantageously, such mixtures will comprise 80 to 95% by weight of the acrylic-type esters of the specified formula and up to 20%, e.g., 5–20%, of the other copolymerizable material although up to 50% of the latter material may be employed if such monomer is capable of giving a flexible homopolymer having about a 100% minimum elongation, e.g., vinyl stearate and the $C_3$–$C_{18}$ alkanol esters of maleic, furamic and itaconic acids; e.g., dibutyl maleate. Such percentages are based on the backbone monomer charge.

Advantageously the cross-linking copolymerizable materials for use in preparing the initial "backbone" flexible polymers of the invention are the acrylic-type polyesters having the formula:

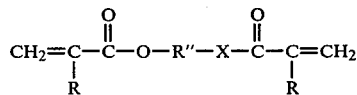

wherein
R is hydrogen or 1 to 4 carbon atom alkyl,
R" is an alkylene radical containing 1 to 5 carbon atoms, and
X is either the radical —O— or a radical

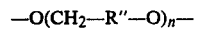

wherein n is a positive integer from 1 to 10.

In addition, acrylate ester monomers having a polymerization functionality greater than two are encompassed by the invention as cross-linking agents, e.g., acrylic acid and methacrylic acid esters of glycerol, hexanetriol, trimethylol propane and pentaerythritol.

Mixtures of these esters may be used, e.g., commercial products containing mixtures of alkylene glycol diacrylates.

Other cross-linking agents may be used in forming the backbone polymers although the acrylic-type polyesters just mentioned have been found generally to provide the best combination of strength, stability and fabrication properties in the final internally plasticized vinyl chloride polymer. Additional cross-linking agents broadly encompassed by the invention include (1) divinyl monocyclic arylenes, e.g., divinyl benzene and divinyl toluene; (2) vinyl esters of acrylic type acids, e.g., vinyl acrylate and vinyl alphapropyl acrylate; (3) allyl and methallyl alphaethylene monocarboxylates, e.g., allyl acrylate, methallyl acrylate and allyl methacrylate; (4) diallyl polycarboxylates, e.g., diallyl phthalate, diallyl terephthalate, diallyl itaconate, diallyl fumarate, diallyl oxalate, diallyl sebacate, 2,4,6-tri(allylamino)-1,3,5-triazine and diallyl 1,2-naphitaconate, diallyl fumarate, diallyl oxalate, diallyl sebacate, materials and mixtures with the preferred acrylic-type polyesters.

The cross-linking copolymerizable monomer material used with the monoethylenically unsaturated monomer in forming the backbone flexible copolymer should be controlled within a relatively narrow limit. Thus, it has been discovered that the monomer mixture used in forming the flexible backbone polymer should contain for each 100 parts of the mixture between about 95 to 99.75 parts of the polymerizable monoethylenically unsaturated material and between about 0.25 to 5 parts of the cross-linking polyunsaturated monomer material. In addition to these two essential components, the monomer mixture will comprise about 0.1 to 5 parts per 100 parts of mixture of a polymer modifying agent such as the alkyl mercaptans containing 4 to 30 carbon atoms.

The first stage polymerization is preferably carried out to high conversions, i.e., conversions of 95% or higher of monomers to polymer, though conversions as low as 85–50% may be employed. The conversion of monomer in the grafting step is carried out to the extent necessary to give the desired ratio of graft polymer to backbone polymer. Such ratio can be 50 to 200 parts of vinyl chloride or other graft monomer mixture to each 100 parts of the backbone copolymer. It is advantageous to employ 70 to 100 parts of vinyl chloride or vinyl chloride mixture as graft monomer to each 100 parts of backbone copolymer. It is preferred to conduct the polymerizations with the monomers initially dispersed as discrete particles in aqueous polymerization systems. Such dispersions may be stable emulsions, i.e., dispersions of such small disperse phase particle size that no phase separation occurs even over long storage periods of the dispersion or aqueous suspensions in which the particle size of the disperse phase is so large that the suspensions must be kept in substantial state of constant agitation to prevent phase separation. The emulsion type polymerization is most advantageously employed.

It is advantageous to conduct both the polymerizations with an aqueous dispersion system and without separation of the initially formed backbone flexible polymer from its aqueous dispersion. In carrying out the methods of the invention using this preferred type operation, the vinyl chloride material is added to the emulsion or suspension of the preformed flexible copolymer all at once and/or in increments, the resulting mixture is stirred or agitated sufficiently to ensure homogeneous distribution of the vinyl chloride material throughout the aqueous dispersion substantially uniformly contacting the individual disperse particles of preformed polymer with monomeric vinyl chloride material. The monomeric vinyl chloride has a certain solvent action upon the preformed flexible copolymer creating a unique polymer structure as the graft polymerization of the vinyl chloride monomer proceeds.

Various catalysts known to the art as useful in catalyzing addition polymerizations, i.e., polymerizations of the vinyl-type may be employed. These include water-soluble free-radical precursor catalysts such as hydrogen peroxide, hydrogen peroxide-urea complexes, potassium persulfate, sodium peroxide or the like. The water-soluble catalyst which according dissolves or concentrates in the aqueous phase when the emulsion or aqueous suspension polymerizations are employed, has been found to produce the most desirable combination of properties in the final internal plasticized polyvinyl chloride polymers. However, organic-soluble peroxides and other organic-soluble free-radical catalysts may be employed which will concentrate or appear primarily as a component of the disperse phase in the emulsion or suspension polymerizations. Such oil-soluble catalysts include the organic peroxides such as benzoyl peroxide, t-butyl hydroperoxide, methyl ethyl ketone peroxide and lauroyl peroxide and azo compounds such as azobis-isobutyronitrile.

The second stage polymerization in which vinyl chloride material is grafted onto the preformed flexible copolymer is advantageously carried out using vinyl chloride per se as the monomeric material. However, mixtures of vinyl chloride with other copolymerizable vinyl and vinylidene esters, acrylic-type esters or the like may be employed. Examples of mixtures contemplated for use include vinyl chloride with up to 20% of other copolymeriable material, e.g., vinylidene chloride, vinyl acetate, 1 to 4 carbon alkyl acrylates or methacrylates, vinyl stearate, and comparable monoethylenically unsaturated copolymerizable materials.

The graft copolymer contains from 24 to 74 parts by weight of butyl acrylate. From 24 to 74 parts by weight polyvinyl chloride and from 1 to 3 parts of a diacrylate cross-linking compound. It is contemplated that the total of components in the graft polymer will, in all cases, equal 100%. There is no intention of comtemplating an impossible composition. The preferred cross-linking agent is ethylene glycol dimethacrylate. A small amount such as about 0.05% of a general transfer agent such as dodecyl mercaptan can also be present in the polymerization stage and in the final graft copolymer product.

Tin process aid and heat stabilizers are also present in the low smoke plastic. From 2 to 6 parts of a mixture of a process aid and heat stabilizer such as a mixture tin carboxylates and tin organo-sulfur compounds are present.

The mix can range from 25% to 75% of either th tin organo-sulfur compound or the tin carboxylate. Examples of tin carboxylates and tin mercaptides which can be employed include those described in U.S. Pat. Nos. 2,888,435, Wallace (1959), 3,085,082 Longmeadow, et al (1963), 3,208,969 Quattlebaum, Jr., et al (1965), 3,398,114 Pollock, (1968), 3,435,098 Watanabe et al (1969), and 3,475,361 Garner (1969).

The term mixture also includes tin compounds containing both mercaptide and carboxylate groups. Examples of tin carboxylates and tin organo-sulfur compounds useful in light and heat stabilizer mixtures include: dibutyltin p-xylene $\alpha,\alpha'$-dimercaptide, dioctyltin p-xylene $\alpha,\alpha'$-dimercaptide, dimercaptomethyl m-xylene, dibutyltin dimercaptide of dimercaptomethyl m-xylene, dimercaptomethyl pseudocumene, dibutyltin thiomaleate laurate, dibutyltin bis(isooctyl thioglycolate), di-n-octyltin bis(isooctyl maleate), tetra p-methyl phenyl tin mercaptide, tetra ethyl tin mercaptide, mixtures of butyl tin lauryl mercaptides, tetra cetyl tin mercaptide, tetra lauryl tin mercaptide, organotin dibutyl tin dioctyl mercaptide, 2,2-dioctyl or dibutyl-1-oxa-2-stanna-3-thiocyclopentane-5-one, dibutyl tin bis butylmercapto acetate, dioctyl tin bis isooctylmercaptoacetate, dioctyl tin sulfide, dibutyl tin sulfide, dimethyl tin dicoconut mercaptide, dibutyl tin distearyl mercaptide, butyl tin tridodecyl mercaptide, diethyl tin decresyl mercaptide, octyl tin triphenyl mercaptide, phenyl tin tributyl mercaptide, methyl tin tricoconut mercaptide, dibutyltin dithioglycolic acid cyclohexyl ester, monobutyltin trithiopropionic acid hexyl ester, triphenyl tin thioglycolic acid benzyl ester, dilauryl tin dithiobutyric acid amyl ester, dipropyl tin dithiovaleric acid tetrahydrofurfuryl ester, dibutyl tin S,S' bis(dibutyl thiomaleate), dibutyl tin S,S' (bis)thiomalic acid).

The tin compound mixture also imparts processability to the composition of the present invention.

The preferred mix contains dibutyl tin dilauryl mercaptide and dibutyl tin maleate.

Preferably a lubricant such as oxidized low molecular weight polyethylene is present at a level of from 0.1 to 3 parts. The lubricant blooms to the surface when the composition of the present invention is extruded or calendered into sheets.

Pigments are present at a level of from 0.5 to 5 parts. For aesthetic purposes the plastic can be pigmented. Pigments include rutile grade titanium dioxide or any of the prior art organic or inorganic pigments.

Internal lubricants such as calcium stearate can also be used to aid in getting the mix through the extruder without degrading.

After-glow of the low smoke plastic can often be prevented by the incorporation of materials such as aluminum oxide trihydrate. The after-glow preventable composition is present at a level of from about 0.5 to 10 parts and preferably from 1 to 7 parts.

The following are specific examples of the practice of the present invention. In the examples, as elsewhere in the specification and claims, all parts and percentages are by weight, and all molecular weights are weight average molecular weights unless otherwise specified.

EXAMPLE I

A blend was made of the following materials:

| Materials | Parts |
| --- | --- |
| [1]A chlorinated polyvinyl chloride having | 100 |

| Materials | Parts |
|---|---|
| an inherent viscosity of 0.91 to 0.9 and a chlorine content of 66% | |
| [2]A graft copolymer of polyvinyl chloride (48%) onto butyl acrylate (48%) and cross-linked with ethylene glycol dimethacrylate (2%) containing 0.05% dodecyl mercaptan chain stopper | 15 |
| [3a]Chlorinated polyethylene having a molecular weight of over 1,000,000 and a chlorine content of 36%. | 7.5 |
| [3b]Chlorinated polyethylene having a molecular weight of less than 100,000 and as estimated chlorine content of 22% | 2.5 |
| [4]Tin carboxylate stabilizer believed to be dilauryl tin dimaleate | 1 |

[1]Lucalor 1176 available from Rhodia Chemical Co.
[2]See U.S. Pat. No. 3,334,156 Calentine et al (1967)
[3a]Available from the Dow Chemical Co. as CLPE 3614
[3b]Available from the Dow Chemical Co. as CLPE 2243.45
[4]Advastab T-290 available from Cincinnati Millicon

| Material | Parts |
|---|---|
| [5]Tin organo-sulfur compounds believed to be dimethyl tin octyl thioglycollate dissolved in 25% of solvent | 2.5 |
| [6]Microcrystalline paraffin wax Hoechst wax PA 190 | 0.5 |
| [7]Oxidized low molecular weight polyethylene | 1.5 |
| Rutile grade titanium dioxide pigment | 14 |
| Aluminum oxide trihydrate $Al_2O_3XH_2O$ | 3 |

[5]Advastab TM-181 available from Cincinnati Millicon
[6]Hoechst wax PA 190 available from American Hoechst Corp.
[7]Allied AC 629A available from the Allied Chemical Company The above ingredients were mixed in a high shear mixer (a Henchel mixer) for 10 minutes. The mixed ingredients were fed into a low shear mixer and cooled to room temperature while mixing. The cooled mix is then fed into a sheet extruder and extruded at stock temperature of 190° C. to 210° C. into sheets of different thicknesses. The tests set forth below were run on the product with the following results.

The ASTM and UL tests which were run, were run in accordance with the test procedures in force Jan. 1, 1976. The flammability and smoke tests were run as according to the procedures set forth in National Bureau of Standards (NBS) Technical Note 708. The abbreviations used in the flammability and smoke tests are also set forth in NBS Technical Note 708.

| Physical Property | ASTM Test | Typical Test Value |
|---|---|---|
| Specific Gravity | D 792 | 1.57 |
| Thermal Distortion at 264 psi | D 648 | |
| 10 Mil Deflection | | 186° F. |
| 60 Mil Deflection | | 208° F. |
| Tensile Strength | D 638 | 5,800 psi |
| % Elongation | D 638 | 40 |
| Izod Impact Strength-Notched at 73° F. | D 256 | 6.6 ft lb/in |
| Izod Impact Strength-Un-Notched at 73° F. | D 256 | 20.0 ft. lbs |
| at −20° F. | | 7.5 ft. lbs |
| Gardner Impact Strength | | |
| at 73° F. | | 160.0 in. lbs |
| at −20° F. | | 20.0 in. lbs |
| Flexural Strength | D 790 | 10,000 psi |
| Flexural Modulus | D 790 | 330,000 psi |
| Rockwell Hardness | D 785 | 107 R |

| Physical Property | ASTM Test | Typical Test Value |
|---|---|---|
| Taber Abrasion Resistance | D 1044 | |
| Weight loss/1,000 cycles | | |
| 1 Kg load | | 0.7 gms |
| Flammability | | |
| 60 Second Vertical Flame Test - 5903 T | | |
| Thickness | .040" | .062" |
| Afterburn | 0 Seconds | 0 Seconds |
| Afterglow | 0 Seconds | 0 Seconds |
| Char Length | 3.7 Inches | 3.3 Inches |
| Radiant Panel | | |
| ASTM E 162 | | 4 |
| UL 94 Test Method | | 94V-0 |
| Oxygen Index | | |
| ASTM D 2863 | | 45 |
| Smoke Contribution | | |
| NBS Smoke Chamber | | |
| Thickness | .040" | .062" |
| Ds 90 Seconds | 43 | 37 |
| Ds 4 Minutes | 116 | 137 |

| Material | Ds 4 Minutes |
|---|---|
| Example I formulation | 95 |
| Self-Extinguishing Polycarbonate | 60 |
| Self-Extinguishing ABS/PVC | 400 |
| PVC/Acrylic | 300 |
| Modified Phenylene Oxide | 700 |

| Sheet Thickness Inches | After Burn Seconds | After Glow Seconds | Char Length Inches |
|---|---|---|---|
| .030 | 0 | 2 | 3.07 |
| .040 | 0 | 0 | 3.74 |
| .062 | 0 | 0 | 3.32 |
| .090 | 0 | 0 | 2.15 |
| .125 | 0 | 1.5 | 2.15 |

| Sheet Thickness Inches | Specific Optical Density | |
|---|---|---|
| | $D_s$ 90 Seconds | $D_s$ 4 Minutes |
| .030 | 34 | 73 |
| .040 | 43 | 116 |
| .062 | 37 | 137 |
| .090 | 23 | 125 |
| .125 | 16 | 95 |

| Reagent | Effect |
|---|---|
| Distilled Water | No change |
| 10% Sodium Chloride | No change |
| 10% Sodium Hydroxide | No change |
| Ammonium Persulfate | No change |
| Chlorox Bleach | No change |
| 30% Hydrochloric Acid | No change |
| 10% Hydrochloric Acid | No change |
| Ethanol | No change |
| Ethylene Glycol | No change |
| Methylene Chloride | Attacked |
| Acetone | Attacked |
| Gasoline | Attacked |

| Substance | Staining Effect |
|---|---|
| Coffee | None |
| Beer | None |
| Milk | None |

-continued

| Substance | Staining Effect |
|---|---|
| Tea | Slight |
| Pepsi Cola | None |
| Tomato Juice | None |
| Orange Juice | None |
| Hi-C | None |
| Bourbon | None |
| Scotch | None |
| Vodka | None |
| Cover Girl Make-up | None |
| Nail Polish | Medium |
| Lipstick | None |
| Hair Spray | None |
| Vinegar | None |
| Corn Oil | None |
| Butter | None |
| Mustard | Slight |
| Sweet Relish | None |
| Catsup | None |
| Joy Liquid Soap | None |
| Chlorox | None |
| Gillette Right Guard | None |
| Sani-flush | None |
| 3 in 1 Oil | None |
| Methanol | None |
| Ammonia | None |
| Chlorothane | None |
| 10% Sulfuric Acid | None |

The effect of varying the amount of ingredients is set forth below. The same ingredients are used as in Example 1, only the proportions are varied.

| | EXAMPLES | | | | |
|---|---|---|---|---|---|
| | 2 | 3 | 4 | 5 | 6 |
| Lucalor 1176 | 100 | 100 | 100 | 100 | 100 |
| CLPE - 3614 | 7.5 | 10 | 25 | — | — |
| CLPE 2243.45 | 2.5 | — | — | — | — |
| Esklor Hi Impact | 15 | — | — | 15 | 25 |
| Advastab T-290 | 1.0 | 1.0 | 1.0 | 1.0 | 1.0 |
| Advastab TM-181 | 2.5 | 2.5 | 2.5 | 2.5 | 2.5 |
| $Ti O_2 RA$-101 | 14 | 14 | 14 | 14 | 14 |
| AC 629A | 1.5 | 1.5 | 1.5 | 1.5 | 1.5 |
| Hoechst Wax PF-190 | .5 | .5 | .5 | .5 | .5 |
| Al Hydrate 704 ($Al_2O_3 3H_2O$) | 3.0 | 3.0 | 3.0 | 3.0 | 3.0 |

| Smoke Contribution NBS Smoke Chamber Flaming Conditions | | | | | |
|---|---|---|---|---|---|
| | EXAMPLES | | | | |
| | 2 | 3 | 4 | 5 | 6 |
| Thickness | 1.55 | 1.57 | 1.55 | 1.57 | 1.60 |
| in mm | 1.55 | 1.57 | 1.55 | 1.60 | 1.60 |
| Dm Corrected | 199 | 99 | 292 | 105 | 122 |
| | 219 | 103 | 279 | 123 | 132 |
| t.Ds = 16 sec. | 1.15 | 1.15 | 1.03 | 1.12 | 1.07 |
| | .97 | 1.97 | 1.07 | 1.08 | 1.13 |
| t.9Dm Min. | 5.0 | 3.2 | 3.8 | 4.2 | 3.9 |
| | 4.2 | 3.3 | 4.2 | 4.4 | 4.2 |
| Ds 90 sec. | 34 | 28 | 45 | 27 | 36 |
| | 46 | 34 | 39 | 32 | 31 |
| Ds 4 Min. | 154 | 98 | 272 | 93 | 111 |
| | 190 | 102 | 249 | 111 | 111 |

EXAMPLE 7

(Best Mode)

Example I is repeated except that Kanevinyl H chlorinated polyvinyl chloride is used to replace Lucalor 1176 CPVC. Kanevinyl H CPVC has a chlorine content of 65% and an inherent viscosity of 0.70 to 0.73. Kanevinyl H is commercially available from Kanegafuchi Chemical Industry Co., Ltd., Asahi Shimbun Building, 3—3 Nokanoshima, Kita-Ku, Osaka, Japan.

Compounding ingredients are charged to a Banbury wherey they are thoroughly mixed and fused to a homogeneous mass under 30 to 60 lbs (134 to 268N) ram pressure, from 3 to 5 minutes to stock temperatures of 360° to 380° F. (182° to 194° C.). The fused mass is then discharged to a Banbury drop mill and milled from 5 to 15 minutes. The mill roll temperatures are:

Front roll—280°–310° F. (137°–154° C.)
Back roll—270°–300° F. (132°–149° C.)

After mixing on the Banbury drop mill the batch is transferred to the calender feed mill and milled from 5 to 15 minutes at the following mill roll temperatures.

Front roll—320°–350° F. (160°–176° C.)
Back roll—310°–340° F. (155°–171° C.)

Calender

The batch is then fed to a 3 or 4 roll calender. For this example a 4 roll inverted L Calender was used. The calender roll conditions preferably are:

Off set roll—340°–370° F. (171°–188° C.)
Top roll—350°–380° F. (177°–193° C.)
Middle roll—340°–370° F. (171°–188° C.)
Bottom roll—330°–360° F. (165°–182° C.)

The sheets are calendered from 10 to 17 mils (0.025 mm to 0.043 mm) thick. Ratios from 10 to 30 yards/(9.1 to 27.3 M) can be achieved. The sheets had excellent low smoke, sheet forming and thermoforming properties.

It is also contemplated that the composition can be extruded into sheet.

EXAMPLES 8-20

The following examples show the adverse effect of eliminating chlorinated polyethylene or the graft polymer of polyvinyl chloride or poly(butyl acrylate) from the formulation. The formulation of the examples were prepared in the laboratory using conventional lab equipment, i.e., Banbury and mill.

When the materials of the present invention are used in aircraft, it is recommended that instead of an oxygen mask falling from a compartment, that a transparent oxygen supplying head covering fall. The HCl given off by the compositions of the present invention is an eye and respiratory tract irritant.

In the following table a conventional stabilizer system, similar to that of Example I was employed. There may have also been some minor variations in sample thickness, but all samples were in the thermoforming thickness range.

| | 8 | 9 | 10 | 11 | 12 | 13 | 14 | 15 | 16 | 17 | 18 | 19 | 20 |
|---|---|---|---|---|---|---|---|---|---|---|---|---|---|
| Lucovinyl 1165 chlorinated polyvinyl chloride | 100 | 100 | 100 | 100 | 100 | 100 | 100 | — | 100 | 100 | 100 | 100 | 100 |
| Lucovinyl 8065 Chlorinated polyvinyl chloride Blendix 435 | — | — | — | — | — | — | — | 100 | — | — | — | — | — |

-continued

|  | 8 | 9 | 10 | 11 | 12 | 13 | 14 | 15 | 16 | 17 | 18 | 19 | 20 |
|---|---|---|---|---|---|---|---|---|---|---|---|---|---|
| acrylonitrile butadiene styrene | — | — | — | 15 | — | — | — | — | — | — | — | — | — |
| Dow 2243.45 chlorinated polyvinyl ethylene | 20 | — | — | 15 | — | — | — | 20 | 20 | — | — | — | — |
| Dow 3614 chlorinated polyvinyl ethylene | — | — | — | — | 15 | 15 | — | — | — | 10 | 25 | — | — |
| Abson 88901 chlorinated polyvinyl ethylene | — | 20 | — | — | — | — | — | — | — | — | — | — | — |
| Esklor graft polymer of polyvinyl chloride on poly(butyl acrylate) | — | — | — | — | 15 | — | 15 | — | — | 15 | — | 15 | 25 |
| Acryloid R&H 611 acrylic based process aid | — | — | 15 | — | — | — | — | — | — | — | — | — | — |
| Smoke contribution NBS Smoke Chamber DM maximum | 409 | 178 | 433 | 364 | 271 | 369 | 150 | 339 | — | 199 | 292 | 133 | 122 |
| Izod Impact Strength ft/lb/in notch | 4.2 | 1.75 | 8.82 | 12 | 7.2 | 1.5 | — | 2.09 | 10.9 | 10.7 | 12 | .95 | .98 |
| Thermoforming | Poor | Poor | Fair | Poor | Good | Poor | Poor | — | — | Good | Poor | Fair | Fair |
| Smoke Requirements DS 90 sec < 100 | 24 | 14 | 30 | — | 39 | 55 | 42 | — | — | 34 | 45 | 27 | 36 |
| DS 4 min < 200 | 194 | 103 | 321 | — | 152 | 284 | 129 | — | — | 154 | 272 | 131 | 111 |

I claim:

1. In a high impact resistant plastic which is fire resistant when heated to flame temperature, comprising a blend of 100 parts by weight of a chlorinated polyvinyl chloride resin having an average molecular weight of from about 50,000 to 140,000; and from about 5 to 30 parts by weight of chlorinated polyethylene, the improvement comprising the chlorinated polyethylene comprising a heterogeneous mixture of from 50% to 95% of a chlorinated polyethylene having a molecular weight of at least 100,000 and a chlorine content of 30% to 45% and from 5% to 50% of the mixture being a low molecular weight chlorinated polyethylene of from 20,000 to 40,000 and having a chlorine content of from 25% to 45%; from about 10 to 20 parts by weight of a cross-linked alkyl acrylate polyvinyl chloride graft copolymer and from about 1 to 10 parts of an organo tin process aid and heat stabilizer, the combination of the graft copolymer, the process aid, and the chlorinated polyethylenes rendering sheets of the plastic thermoformable.

2. A composition according to claim 1 wherein the chlorinated polyvinyl chloride has an average molecular weight of from about 80,000 to 120,000 and wherein he low molecular weight chlorinated polyethylene has an average chlorine content of from about 30% to 40%.

3. The composition according to claim 1 wherein the tin process aid and heat stabilizer is selected from the group consisting of mixtures of tin carboxylates and tin thioglycollates.

* * * * *